United States Patent [19]
Johnson et al.

[11] 3,821,771
[45] June 28, 1974

[54] NON-FOLDING TRIPOD ADAPTER

[75] Inventors: Bruce K. Johnson, Andover; John M. Reynard, Framingham, both of Mass.

[73] Assignee: Polaroid Corporation, Cambridge, Mass.

[22] Filed: Oct. 24, 1972

[21] Appl. No.: 300,158

[52] U.S. Cl. ................................. 95/86, 352/243
[51] Int. Cl. ....................................... G03b 17/56
[58] Field of Search ..................... 95/86; 352/243

[56] References Cited
UNITED STATES PATENTS

| 962,844 | 6/1910 | Kaufmann | 95/86 |
| 2,567,068 | 9/1951 | Halmer | 95/86 X |
| 2,824,503 | 2/1958 | Weiss | 95/86 |
| 2,922,609 | 1/1960 | Collier | 95/86 X |
| 3,263,588 | 8/1966 | Robinson | 95/86 |
| 3,291,179 | 12/1966 | Lang | 95/86 X |
| 3,511,159 | 5/1970 | Hobbs, Jr. | 95/86 |

Primary Examiner—Richard M. Sheer
Assistant Examiner—F. M. Bero

[57] ABSTRACT

A non-folding adapter for use with a folding photographic camera characterized in having an optical axis in a nonparallel orientation with respect to a supporting base of the camera. The adapter includes first and second sections angularly oriented with respect to each other. The adapter is configured to be attached to the supporting base of the camera for permitting a realignment of the camera's optical axis to a horizontal position when the camera and adapter are placed on a horizontal surface. The adapter permits the camera to be conveniently coupled to a conventional tripod or positioned on a flat surface with the optical axis horizontally directed. The adapter additionally includes a portion thereof which prevents inadvertent folding of the camera while the adapter is attached to the camera.

13 Claims, 4 Drawing Figures

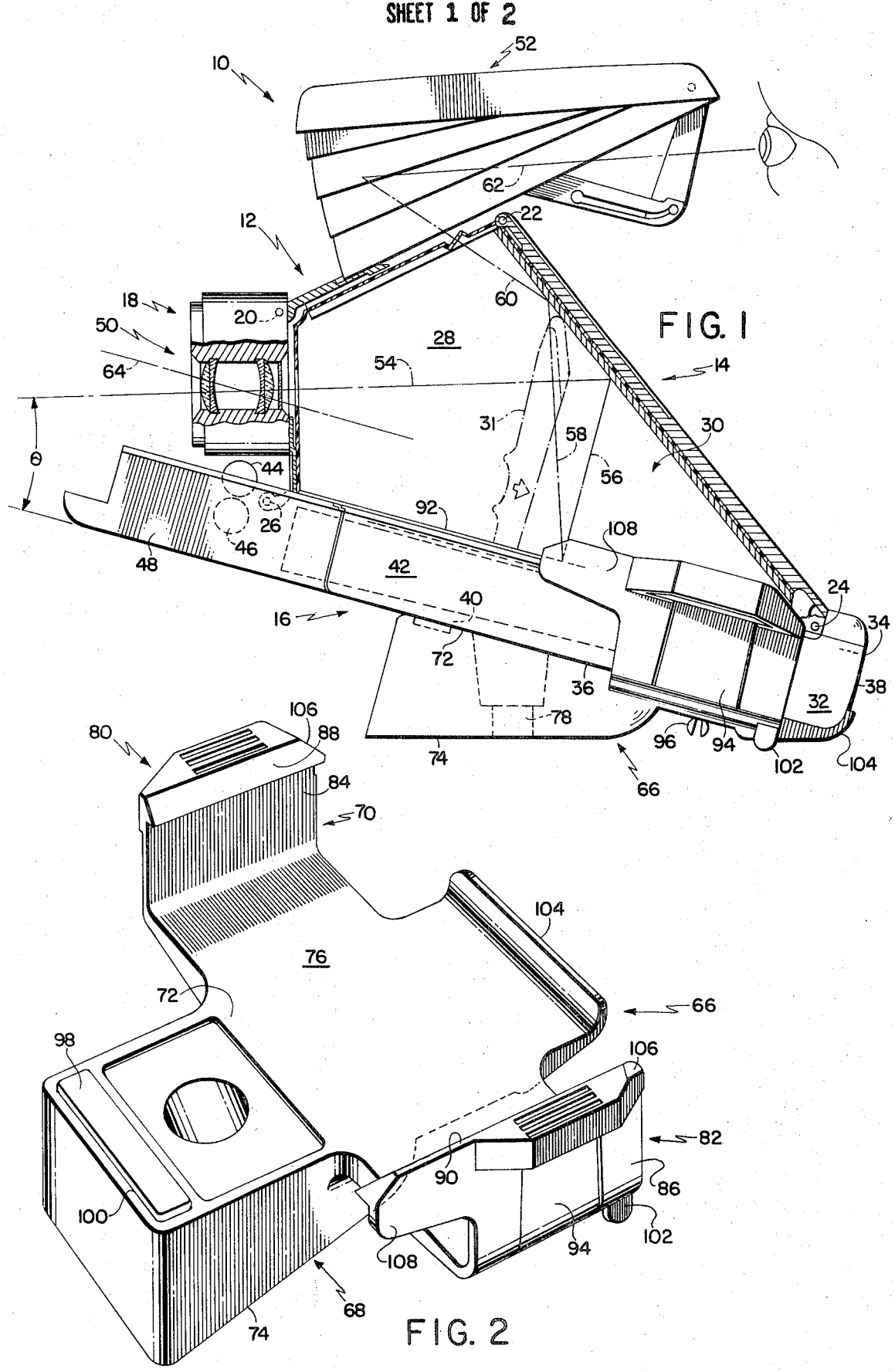

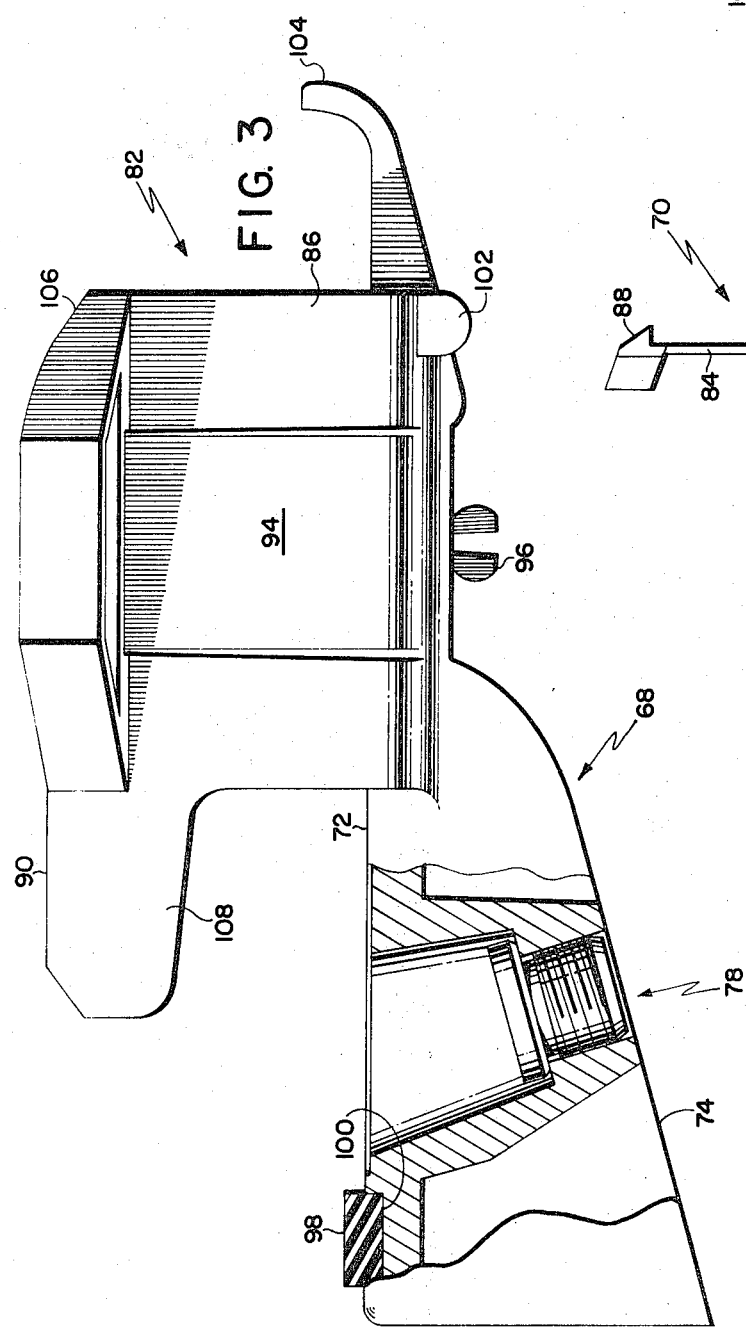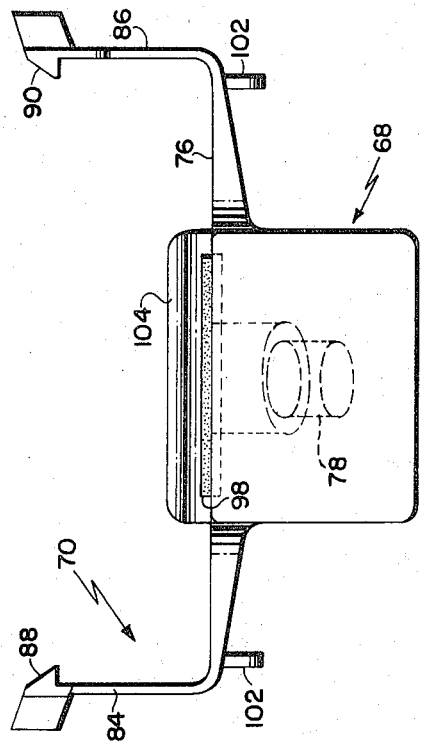

NON-FOLDING TRIPOD ADAPTER

BACKGROUND OF THE INVENTION

A new variety of photographic cameras has been developed by the assignee of this application which, in part, are characterized in having an optical axis oriented at an acute angle to the base of the camera body. Exemplary of this variety of camera are those shown in U.S. Pat. Nos. 3,589,253; 3,641,889; and 3,618,493. As shown in the referenced patents, the optical axis of the camera lens is in a nonparallel orientation with respect to the supporting base of the camera. Accordingly, if the supporting base of the camera is employed to support the camera on a typical tripod mount, the camera's optical axis will be directed not toward the horizon but below it. Moreover, the camera, as configured, may not be easily placed on any convenient flat surfaces, e.g., a table, for time exposure pictures.

A tripod adapter which permits the mounting of such a camera to a typical tripod is disclosed in the copending application for U.S. Pat. entitled "A Non-folding Tripod Adapter" by Edison R. Brandt, Ser. No. 246,808, filed Apr. 24, 1972 and assigned to the assignee of the present application. Additionally, the adapter may be used to position the camera's optical axis parallel with the horizon when the camera is placed on any horizontal surface should a tripod be unavailable or undesirable.

SUMMARY OF THE INVENTION

The present invention is concerned with an improved tripod adapter which includes a member which precludes the camera from being folded while it is attached, thereby preventing damage to the adapter.

It is, therefore, a general object of this invention to provide an adapter for a photographic camera having an optical axis which is not parallel to the supporting base of the camera.

It is another object and feature of the present invention to provide an inexpensive and uncomplicated tripod adapter for use in conjunction with a photographic camera.

A further oject and feature of the present 22 invention is to provide a tripod r for use in conjunction with a photographic camera, the tripod adapter including a first surface for coupling to and supporting the base of the camera; a second surface connected to the first surface, the second surface and the first surface being angularly separated an amount substantially equal to the angular separation between the supporting base of the camera and the optical axis of the camera; and means for attaching the tripod adapter to the camera.

Still a further object and feature of the present invention is to provide a non-folding tripod adapter for a foldable photographic camera including resilient detents engageable with at least a portion of the camera, for retaining the adapter on the camera, the detents including means for preventing the camera from being folded while the adapter is attached to the camera.

Another object and feature of the present invention is to provide a non-folding tripod adapter for a foldable photographic camera including resilient detents, engageable with at least a portion of the camera, for retaining the adapter on the camera, the detents including an extension positioned in the path of folding of the camera housing when the camera is in an erected state for preventing the camera from being folded while the adapter is attached to the camera.

Further objects and advantages of the invention will in part be obvious and will in part become apparent as the following description proceeds. The features of novelty which characterize the invention will be pointed out with particularity in the claims annexed to and forming part of this specification.

BRIEF DESCRIPTION OF THE DRAWINGS

FIG. 1 is a lateral view of a photographic camera mounted on a preferred embodiment of a tripod adapter according to the present invention;

FIG. 2 is a perspective view of the tripod adapter of the present invention;

FIG. 3 is a lateral view of the tripod adapter according to the present invention; and FIG. 4 is a front view of the tripod adapter according to the present invention.

DESCRIPTION OF THE PREFERRED EMBODIMENT

Reference is now made to FIG. 1 wherein there is shown a foldable, single lens reflex camera 10 of the self-developing type in its extended or operative position. The camera includes first, second, third and fourth housing sections 12, 14, 16, and 18, respectively, pivotally coupled to each other at pivots 20, 22, 24 and 26 for relative movement between a folded configuration (not shown) and the extended position as shown in FIG. 1. Housing sections 12, 14, 16 and 18 cooperate with a flexible bellows 28, secured thereto to form a six-sided exposure chamber 30. An erecting arm 31 is provided for retaining the housing sections 12, 14, 16 and 18 in their extended position. Third housing section 16 includes a pair of laterally spaced side walls 32 and 34 interconnected by a bottom wall 36 and an end wall 38 to define a U-shaped chamber 40 for receiving a film assemblage 42 shown in dashed lines therein. Extending forwardly of chamber 40 are a pair of rollers 44 and 46. Rollers 44 and 46 are mounted upon a roller support housing 48. Roller housing 48 is pivotally coupled to third housing section 16 and is adapted to be pivoted in a counterclockwise manner to move rollers 44 and 46 to a position wherein a film container 42 may be inserted into or withdrawn from chamber 40. Finally, fourth housing section 18 is pivotally coupled near its ends to housing sections 12 and 16 and is provided with means for mounting a lens and shutter assembly 50 and a shutter release button (not shown).

A viewing device 52 is mounted on first housing section 12 for movement between an operative position, as shown in FIG. 1, and an inoperative position (not shown). For a fuller understanding of the features and operation of viewing device 52, reference should be made to the copending application for United States Patent entitled "Photographic Apparatus" by Richard J. Fraser and John E. McGrath, Jr., Ser. No. 203,735, filed Dec. 1, 1971 and assigned in common herewith.

Lens and shutter assembly 50 is so oriented to define an optical axis 54 which is perpendicular to fourth housing section 18. Light passing along the optical axis is reflectively redirected a series of times, by a plurality of mirrored surfaces (not shown), within camera 10, as may be evidenced by its light path shown by lines 56, 58, 60 and 62. The optical axis 54 of lens and shutter assembly 50 is oriented at an acute angle θ with respect to third housing section 16 which acts as a support base for camera 10. In one preferred embodiment of camera 10, this angle θ is equal to approximately 15°. Thus, lens assembly 50 is directed at an angle of 15° below the horizon, as shown by line 64, and therefore, must be redirected for the majority of photographs which the camera user might take.

Looking to FIG. 2, there is shown a preferred embodiment of the present invention. A non-folding tripod adapter, shown at 66, is a generally T-shaped member. Adapter 66 is formed having a first triangularly shaped portion 68 and a second elongated U-shaped portion 70 integrally formed therewith. First portion 68 is configured having a top portion 72 and a bottom portion 74 oriented at an acute angle of 15° from top portion 72. U-shaped portion 70 includes a planar section 76 which is coplanar with top portion 72. A standard sized threaded bore 78 is provided within first portion 68 for accepting the mounting screw of a conventional tripod. U-shaped portion 70 includes resilient detent structures 80 and 82 at each of its ends. Detent structures 80 and 82 include wall portions 84 and 86 and hooked portions 88 and 90, respectively. Hooked portions 88 and 90 serve to retain adapter 66 to camera 10 through a top portion 92 of side walls 32 and 34. Detent structures 80 and 82 are separated a distance equal to the width of camera 10 for accommodating the latter when it is attached to adapter 66. A metal band 94 is provided on adapter 66 for insuring that wall portions 84 and 86, which are formed of plastic are not deformed through constant flexing. Band 94 provides a memory for detents 80 and 82 thereby insuring that they will return to their unflexed position after adapter 66 is removed from camera 10. Band 94 extends from the exterior of hooked portion 88 around the outside of U-shaped portion 70 to the exterior of hooked portion 90. Band 94 is retained in its position by tucking its ends into recesses (not shown) provided in exterior of hooked portions 88 and 90 and through a deformable button 96 which is engaged by a suitably sized hole (not shown) in the center of band 94. Additionally provided on the top of first portion 68 is a soft pad 98, the purpose of which will become more apparent below. Pad 98 fits within a recess 100 and extends above the plane of top portion 72 of first portion 68.

When adapter 66 is used for supporting camera 10 on a flat surface two feet 102 located on the bottom of U-shaped portion 70 along with bottom portion 74, provide a solid planar support for adapter 66 and proper stability for operation of camera 10. Finally, located at the rearward edge of tripod adapter 66 is a short vertical wall 104 having a gradual slope between the substantially flat portion of U-shaped portion 70 and the vertical wall 104. The gradual slope of wall 104 generally conforms with the slope of rear wall 38 of camera 10. Adapter 66 may be formed of molded plastic or may be machined from a metal such as aluminum.

The manner in which adapter 66 is attached to camera 10 is shown in FIG. 1. The adapter 66 is positioned at the rearward portion of the camera proximate end wall 38. The erected camera 10 is inserted, rear end first, into adapter 66 between detent structures 80 and 82 until the rear wall 38 of camera 10 contacts the vertical wall 104 of adapter 66. The sloped portion of camera 10 just below rear wall 38 now coincides with the sloped portion of the adapter. Third housing section 16 of camera 10 is adjacent the flat portion 76 of second portion 70 as is shown in FIG. 2. When camera 10 is correctly seated upon adapter 66, the hook portions 88 and 90 fall over the top edge 92 of laterally spaced side walls 32 and 34. It is this engagement which holds adapter 66 to camera 10. A sloped portion 106, located at the rear of hooked portions 88 and 90, fits along the inner portion of second housing section 14 thereby preventing adapter 66 from slipping backward along camera 10 toward rear wall 38.

In a preferred embodiment, a pad 98 is provided which contacts the bottom wall 36 of camera 10 to provide a simple slack absorbing element between bottom wall 36 and top portion 72, thereby providing greater manufacturing tolerances for adapter 66. Adapter 66 also permits the pivoting of roller housing 48 thereby allowing the camera user to load camera 10 with film when the adapter is mounted to camera 10 and both are mounted on a tripod. It should also be noted that adapter 66 may be attached to camera 10 only when the latter is in an erected state.

In accordance with this invention, at least one of the detent means is provided with means to prevent substantial folding camera 10 while adapter 66 is coupled thereto. In a preferred embodiment, this object is achieved by extending hooked portion 90 forwardly and proximate erecting link 31 when the adapter is connected to the camera. Folding camera 10 is commenced by pushing erecting link 31 in the direction of the arrow shown thereon. An extension 108 of hooked portion 90 is so positioned in the initial path of movement of erecting link 31 as to stop link 31, unless the adapter has been removed, therefore preventing damage to the camera.

Moreover, sloped portions 106, located at the rear of detent structures 80 and 82, prevent adapter 66 from being pushed off the camera when erecting link 31 is pushed and folding is forced.

When camera 10 is properly mounted upon adapter 66, the threaded bore 78 is positioned substantially directly below the center of gravity of the erected camera 10. As a result, camera 10 is solidly supported and may be mounted upon a conventional tripod or placed upon a flat horizontal surface such as a table. When the camera 10 is placed on a table, it is supported by feet 102 and bottom portion 74 of first portion 68. It should be noted that the plane of second portion 70 of adapter 66 is oriented at an angle of 15° with respect to the plane defined by feet 102 and bottom portion 74. One optional element which may be included within adapter 66 is a thin friction pad (not shown) attached to the front portion of bottom portion 74. Such a pad would prevent any slippage of the adapter when placed on a horizontal surface.

With the arrangement shown, the optical axis 54 of camera 10 is reoriented 15° upward and is now parallel with the horizon. It is in this reoriented position that the majority of self-timed and cable released photographs are taken. This is true both when the adapter 66 is attached to a conventional tripod or merely placed upon a flat horizontal surface.

It should become obvious to those skilled in the art that there are a variety of ways in which to form a tripod adapter of the type herein disclosed. While a preferred embodiment has been discussed, it is meant to be illustrative and not limiting. Applicant has provided a tripod adapter which functions to reorient the optical axis of a camera from a normal non-horizontal position to a horizontal position, the adapter including means to prevent folding of the camera unless the adapter is first removed.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An adapter for a foldable photographic camera having an objective lens and a plurality of foldable housing elements including a supporting base upon which said camera may be conveniently supported, the optical axis of said objective lens being oriented at an acute angle with respect to the supporting base when said camera is in an erected state, said adapter reorienting the optical axis of said objective lens from its alignment when said camera is supported by said supporting base, said adapter comprising:
   a first planar section engageable with at least a portion of said supporting base of said housing for receiving and supporting said camera;
   a second section angularly disposed with respect to said first section, the planes of said second section and said first section being oriented with respect to each other at an angle substantially equal to said acute angle between said optical axis and said supporting base; and
   resilient detent means, engageable with at least a portion of said camera, for retaining said adapter on said camera, said resilient detent means including means, at least a portion of which is positioned between at least two of said foldable housing elements for preventing said at least two foldable housing elements from being moved to cause a substantial folding of said photographic camera while said adapter is attached to said camera.

2. The adapter according to claim 1 in which detent means extend from said first section.

3. The adapter according to claim 2 in which means are provided upon said adapter for limiting the longitudinal movement of said camera within said adapter when said adapter is attached to said camera.

4. The adapter according to claim 3 in which said means for limiting the longitudinal movement of said camera is formed as a vertical wall member at a rearward edge of said first section, said vertical wall member being engageable with at least a portion of an end of said supporting base of said camera.

5. The adapter according to claim 4 in which said first section has an inside width substantially equal to the width of said camera.

6. The adapter according to claim 5 in which said second section has a width substantially less than the width of said first section.

7. The adapter according to claim 6 in which foot means are provided on the bottom of said first planar section, said foot means and a bottom portion of said second section establishing a plane for providing a supporting base for said adapter, said plane established by said foot means and said bottom portion of said second section and said plane of said first section being oriented at an angle substantially equal to said acute angle between said optical axis and said supporting base.

8. The adapter according to claim 7 in which said second section is formed having a bore therein through which said adapter may be coupled to a tripod, said bore being located substantially below the center of gravity of said camera when said camera is mounted to said adapter.

9. The adapter according to claim 8 in which said resilient detent means include means for insuring the return of said resilient detent means to an unflexed position, thereby minimizing deformation through the resilient flexing thereof.

10. The adapter according to claim 9 in which said means for insuring the return of said detent means is a metal band.

11. The adapter according to claim 10 in which said metal band extends from one detent means around the outer perimeter of said first section to the other detent means.

12. The adapter according to claim 2 in which said means for preventing said camera from being substantially folded is an extension on at least one of said detent means, said extension being positioned in the path of folding of at least two of said housing elements when said camera is in its said erected state.

13. An adapter for use with a folding camera having an objective lens and a plurality of foldable housing elements, the optical axis of said objective lens being oriented at an acute angle with respect to a supporting base of said housing when said camera is in an erected state, said camera including a foldable erecting link for retaining said camera in an erected state, said adapter reorienting the optical axis of said objective lens from its alignment when said camera is supported by said supporting base, said adapter comprising:
   a first planar section engageable with at least a portion of said supporting base of said housing for receiving and supporting said camera;
   a second section angularly disposed with respect to said first section, the planes of said second section and said first section being oriented with respect to each other at an angle substantially equal to said acute angle between said optical axis and said base; and
   resilient detent means engageable with at least a portion of said camera, for retaining said adapter on said camera, said resilient detent means including means for preventing closing of said camera to its folded state comprising extension means positioned between at least two of said foldable housing elements in the path of initial folding movement of said erecting link when said adapter is attached to said camera.

* * * * *